(12) United States Patent
Nakakuki et al.

(10) Patent No.: US 7,536,367 B2
(45) Date of Patent: May 19, 2009

(54) IMAGE SIGNAL PROCESSOR

(75) Inventors: Toshio Nakakuki, Mizuho (JP);
Tsuyoshi Mitsui, Ora-gun (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 629 days.

(21) Appl. No.: 11/234,207

(22) Filed: Sep. 26, 2005

(65) Prior Publication Data

US 2006/0072021 A1    Apr. 6, 2006

(30) Foreign Application Priority Data

Sep. 30, 2004    (JP)    ............................... 2004-288220

(51) Int. Cl.
*G06E 1/00*    (2006.01)
*G06E 3/00*    (2006.01)
*G06F 15/18*    (2006.01)
*G06G 7/00*    (2006.01)

(52) U.S. Cl. ...................................................... 706/20

(58) Field of Classification Search ...................... None
See application file for complete search history.

(56) References Cited

U.S. PATENT DOCUMENTS

| | | | | |
|---|---|---|---|---|
| 5,587,746 | A * | 12/1996 | Nakakuki | 348/708 |
| 5,920,343 | A * | 7/1999 | Watanabe et al. | 348/222.1 |
| 6,160,593 | A * | 12/2000 | Nakakuki | 348/713 |
| 6,239,810 | B1 * | 5/2001 | Van Hook et al. | 345/420 |
| 6,331,856 | B1 * | 12/2001 | Van Hook et al. | 345/503 |
| 6,342,892 | B1 * | 1/2002 | Van Hook et al. | 345/503 |
| 6,556,197 | B1 * | 4/2003 | Van Hook et al. | 345/419 |
| 6,593,929 | B2 * | 7/2003 | Van Hook et al. | 345/501 |
| 6,667,730 | B1 * | 12/2003 | Taguchi et al. | 345/99 |

(Continued)

FOREIGN PATENT DOCUMENTS

JP    A 2003-116044    4/2003

OTHER PUBLICATIONS

SoC design of an auto-focus driving image signal processor for mobile camera applications Sung-Min Sohn; Sung-Hyun Yang; Sang-Wook Kim; Kug-Hyun Baek; Woo-Hyun Paik; Consumer Electronics, IEEE Transactions on vol. 52, Issue 1, Feb. 2006 pp. 10-16 Digital Object Identifier 10.1109/TCE.2006.1605018.*

(Continued)

*Primary Examiner*—Michael B Holmes
(74) *Attorney, Agent, or Firm*—Oliff & Berridge, PLC

(57) ABSTRACT

In an image signal processor with which a group of control variables, having relevance to one another, stored in registers are activated synchronously with the switching of a picture, when a host sets the control variable group in the registers, mutual coherency is secured even if the setting operation extends beyond a pulse of a vertical synchronous signal (VD). In order to realize this, an operation for setting a control variable group in a register block (20) by the host, and an operation for reflecting the control variable group in a DSP block (22), are separately performed. After setting of the control variable group, the host sets H level in a VLAT register (30). In correspondence with this operation, a control portion (24) updates an output of a latch circuit (36). As a result, the control variable group is activated from the register block (20) to the DSP block (22).

5 Claims, 7 Drawing Sheets

U.S. PATENT DOCUMENTS

| | | | | |
|---|---|---|---|---|
| 6,816,446 | B2* | 11/2004 | Yoshida et al. | 369/53.24 |
| 6,979,823 | B2* | 12/2005 | Shinada et al. | 250/310 |
| 7,113,206 | B2* | 9/2006 | Nakakuki | 348/222.1 |
| 7,363,466 | B2* | 4/2008 | Ohsuga et al. | 712/33 |
| 2002/0141776 | A1* | 10/2002 | Hirakawa et al. | 399/81 |

OTHER PUBLICATIONS

CRISP: coarse-grain reconfigurable image signal processor for digital still cameras Chen, J.C.; Chun-Fu Shen; Shao-Yi Chien; Circuits and Systems, 2006. ISCAS 2006. Proceedings. 2006 IEEE International Symposium on 0-0 0 p. 4 pp. 4382 Digital Object Identifier 10.1109/ISCAS.2006.1693599.*

Noise Reduction for Image Signal Processor in Digital Cameras Yeul-Min Baek; Dong-Chan Cho; Jin-Aeon Lee; Whoi-Yul Kim; Convergence and Hybrid Information Technology, 2008. ICHIT '08. International Conference on Aug. 28-30, 2008 pp. 474-481 Digital Object Identifier 10.1109/ICHIT.2008.233.*

Design and implementation of two key image processing techniques for CMOS image sensor based on fpga Yu Zhang; Su-ying Yao; Na Zhang; Jiang-tao Xu; Solid-State and Integrated-Circuit Technology, 2008. ICSICT 2008. 9th International Conference on Oct. 20-23, 2008 pp. 2152-2155 Digital Object Identifier 10.1109/ICSICT.2008. 4734994.*

* cited by examiner

IMAGE SIGNAL PROCESSOR

FIELD OF THE INVENTION

The present invention relates to an image signal processor for processing an image signal which is acquired with an image pickup apparatus and displayed in the form of an image on an image display apparatus, and more particularly to update or readout of control variables relating to signal processing.

BACKGROUND OF THE INVENTION

In an image pickup apparatus such as a video camera, after an image signal acquired with an image pickup device such as a Charge Coupled Device (CCD) image sensor has been subjected to signal processing, the resulting signal is recorded in a storage medium or displayed in the form of an image on a display apparatus. An analog signal processing circuit and a digital signal processing circuit execute the signal processing. In particular, within the digital signal processing circuit, a Digital Signal Processor (DSP) executes the image processing while referring to or updating various control variables which are set in a register.

For example, the DSP is constituted by a DSP block for executing image signal processing, and a register block including a plurality of registers in which control variables can be set from the outside. The DSP block stores variables representing an image state, etc., such as an exposure state, which are obtained by means of the image signal processing in the registers, and executes the image signal processing for a next picture by using those variables. Also, the DSP block utilizes the variables which are set in the register block from the outside in the image signal processing. The control variables which are set in the register block from the outside are activated by being taken in by the processing in the DSP block to be reflected therein.

Concerning the timing for this activation, for example, there exists variables which can be activated immediately after being set in the register block, and variables which are activated synchronously with switching of a picture. A setting parameter of a synchronous signal system, an image size, an output mode, and the like are known as examples of the latter.

On the other hand, it is desired to reference the control variables generated through certain processing in the DSP block from other processing or from the outside in some cases. For example, in white balance adjustment, reference is made to an integrated value for each of the color components consisting of red (R), green (G), and blue (B) for one picture.

A set of control variables having relevance to one another in the processing in the DSP block exists in the control variables set in the register block. When any one of the variables is changed in that set, other variables of that set must also be coherently changed. The rise timing and decay timing of a horizontal synchronous signal are given as examples of such a set. Clocks specifying the two kinds of timing each are stored in two registers. The contents of the four registers in total are activated synchronously with the switching of the picture. For example, when the setting for the register is performed from host equipment (hereinafter referred to as "a host") such as a host computer provided outside the DSP, normally this setting is performed in accordance with a sequential procedure. It therefore takes some time to perform the setting for a plurality of registers. For this reason, in order to maintain the coherency of a group of control variables having relevance to one another at the time of activation synchronized with the switching of the picture, conventionally, care needs to be taken so that a period of time required for an operation for setting a group of control variables in the register does not extend over the duration of a pulse of a vertical synchronous signal VD defining the switching of the picture. Thus, the host for performing the setting for the register must monitor the vertical synchronous signal VD. As a result, a problem is encountered where a circuit and a program become complicated in structure, and a processing load is increased.

On the other hand, even when reference is made to the control variables generated in the DSP block, the same problem arises. That is, of the control variables which are updated every picture, a group of control variables having relevance to one another need to be read out within the same picture period. For this reason, for example, the host which refers to the control variables in the DSP block needs to monitor the vertical synchronous signal VD and complete the readout operation for a period of time which does not extend over the duration of the pulse of the vertical synchronous signal VD. As a result, the problem is encountered where a circuit and a program become complicated in structure, and a processing load is increased.

SUMMARY OF THE INVENTION

The present invention has been made in order to solve the above-mentioned problems, and it is therefore an object of the present invention to provide an image signal processor which is capable of making setting and readout of a group of control variables easy even when a group of control variables which have relevance to one another and which are stored in registers are collectively activated or updated synchronously with a synchronous signal of an image signal.

According to an aspect of the present invention, there is provided an image signal processor for fetching a group of control variables set in registers in signal processing and collectively activating the group of control variables thus fetched synchronously with a synchronous signal of an image signal, the image signal processor including: an activation approval or disapproval state storing a portion which represents an approval or disapproval state for the activation of the group of control variables and in which the approval or disapproval state is changed from an activation prohibited state to an activation permitted state in correspondence to completion of setting of the group of control variables in the registers; and a control portion for controlling the activation synchronized with the synchronous signal in correspondence with the approval or disapproval state which is stored in the activation approval or disapproval state storing portion.

According to another aspect of the present invention, there is provided an image signal processor for updating a group of control variables stored in registers synchronously with update of a picture, the image signal processor including: a readout request state storing portion which is set in a readout requested state in accordance with a readout request made to the group of control variables, and is set in a readout unrequested state when no readout request is made; and a control portion for switching an update approval or disapproval state of the group of control variables from a permitted state over to a prohibited state in correspondence with the setting of the readout requested state and for switching the update approval or disapproval state of the group of control variables from the prohibited state over to the permitted state in correspondence with the setting of the readout unrequested state.

DESCRIPTION OF THE PREFERRED EMBODIMENT(S)

Hereinafter, an embodiment of the present invention will be described with reference to the accompanying drawings.

Figure 1:
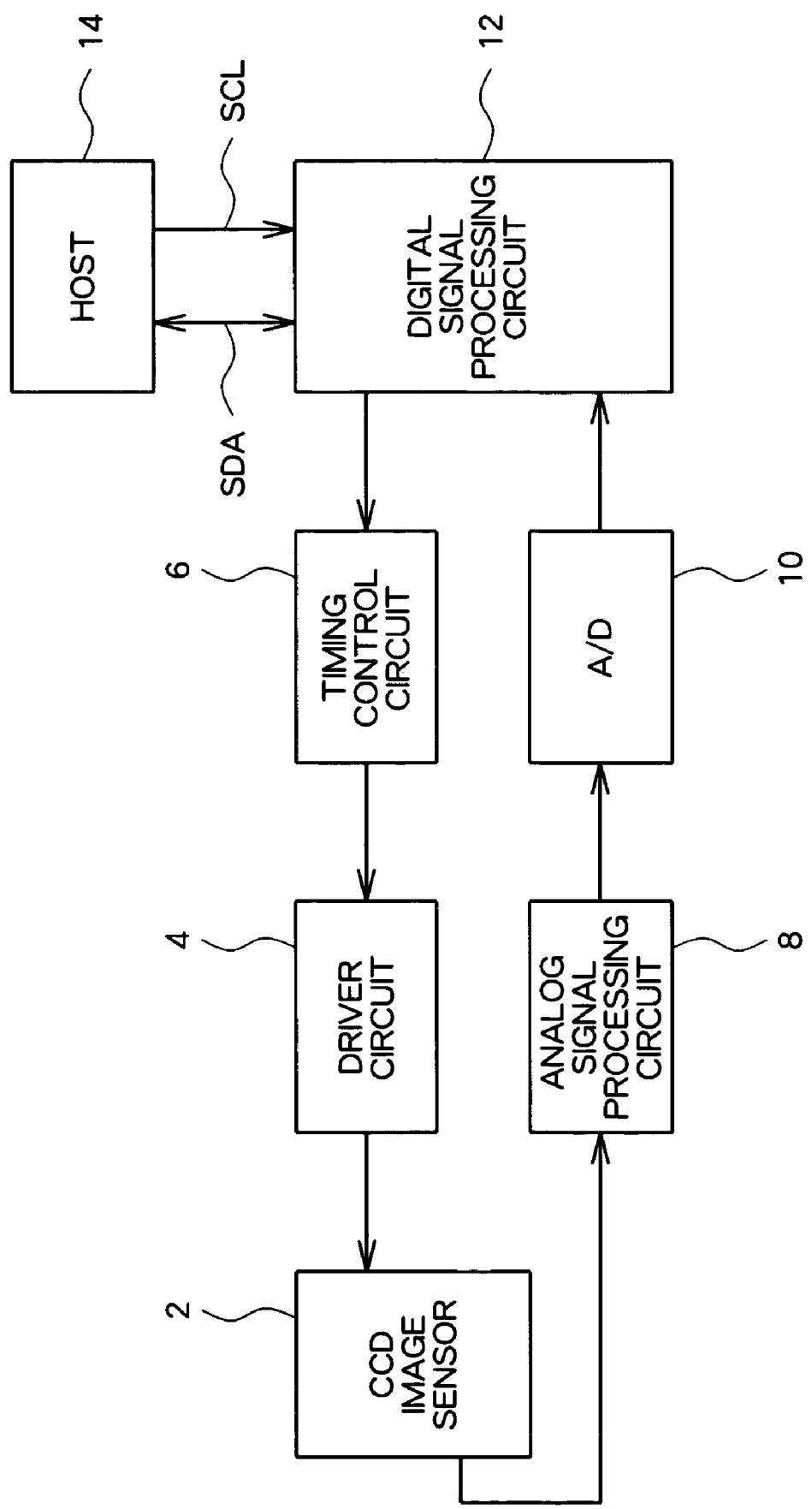
FIG. 1 is a block diagram showing a schematic configuration of an image pickup apparatus according to an embodiment of the present invention.

FIG. 1 is a block diagram showing a schematic configuration of an image pickup apparatus according to an embodiment of the present invention. The image pickup apparatus shown in FIG. 1 includes a CCD image sensor 2, a driver circuit 4, a timing control circuit 6, an analog signal processing circuit 8, an A/D conversion circuit 10, and a digital signal processing circuit 12.

The timing control circuit 6 counts a reference clock CK and generates timing signals such as a vertical synchronous signal (hereinafter referred to as "VD") and a horizontal synchronous signal (hereinafter referred to as "HD") to supply those timing signals to the driver circuit 4. The driver circuit 4 generates and supplies driving pulses to respective portions of the CCD image sensor 2 to drive the CCD image sensor 2 in accordance with the timing signals.

An image signal outputted from the CCD image sensor 2 is inputted to the analog signal processing circuit 8. The analog signal processing circuit 8 subjects the image signal obtained from the CCD image sensor 2 to processing such as Correlated Double Sampling (CDS) and Automatic Gain Control (AGC). The A/D conversion circuit 10 converts the image signal outputted from the analog signal processing circuit 8 into a digital signal on a pixel by pixel basis to generate image data.

The digital signal processing circuit 12 corresponds to an image signal processor according to the present invention, and is constituted by a DSP. The digital signal processing circuit 12 receives as its input the image data from the A/D conversion circuit 10 and subjects the input image data to image signal processing such as color separation, a matrix operation, and white balance adjustment. The digital signal processing circuit 12 supplies control variables used in timing control in the timing control circuit 6 to the timing control circuit 6. Also, the digital signal processing circuit 12 can communicate with a host 14 through a serial bus for example.

The DSP of the digital signal processing circuit 12 includes a DSP block for executing image signal processing, and a register block having a plurality of registers each of which can be accessed from the outside. The DSP block executes the image signal processing while referring to or updating the various control variables set in the registers within the register block or the DSP block.

Figure 2:
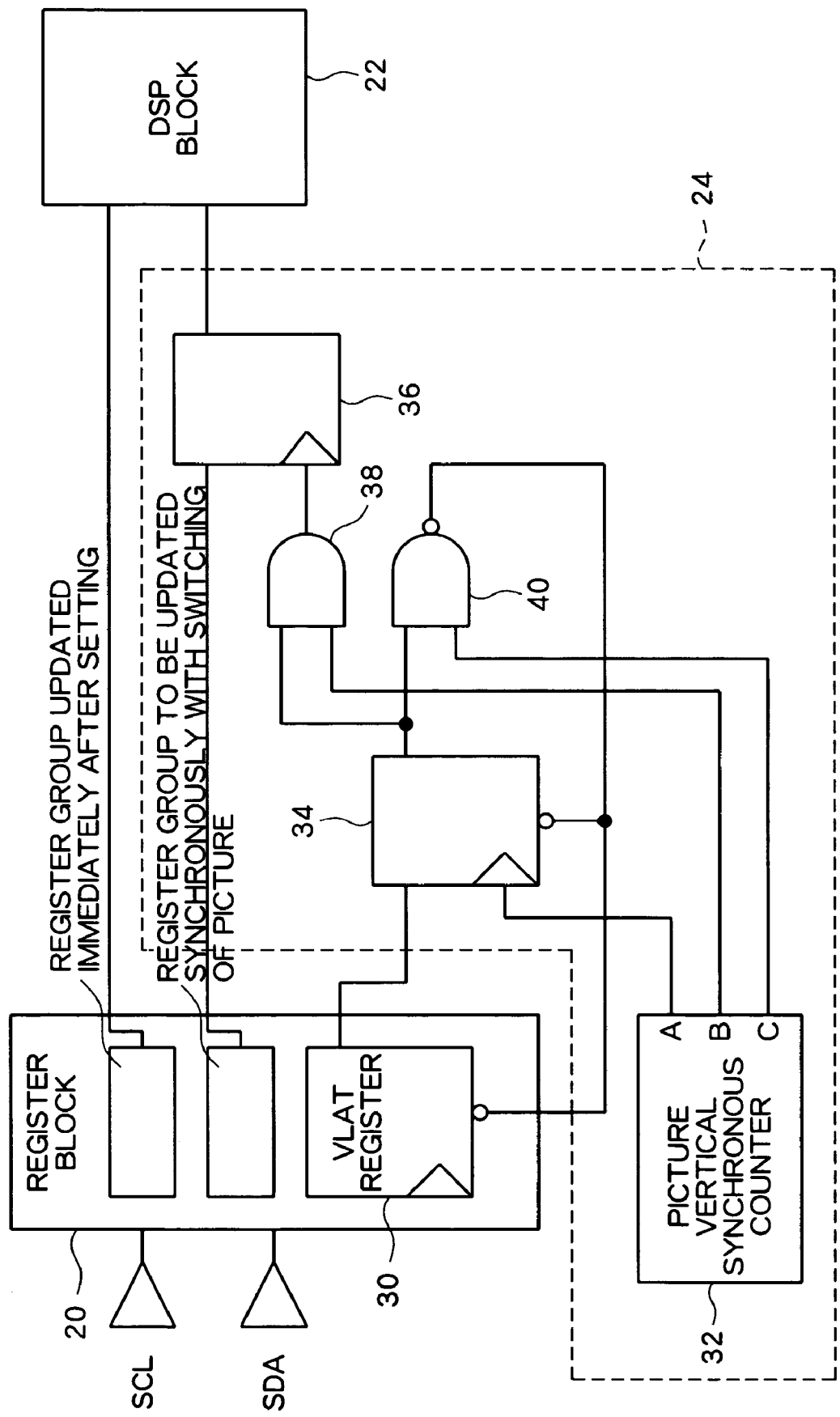
FIG. 2 is a circuit diagram showing an example of a schematic configuration of a DSP related to a case where control variables used in a DSP block are set in a register block.

FIG. 2 is a circuit diagram showing an example of a schematic configuration of the DSP. This figure especially shows a configuration for setting the control variables used in the DSP block 22 in the register block 20. The DSP block 22 can collectively fetch a predetermined group of control variables set in a plurality of registers of the register block 20 in the signal processing synchronously with a pulse of the VD signal to activate the predetermined group of control variables fetched therein. In order to perform the control for the activation, a control portion 24 is provided and a VLAT register 30 is provided in a register block 20. The VLAT register 30 represents an approval or disapproval state for the activation of a group of control variables. Thus, the approval or disapproval state represents a prohibited state when the stored value is "L" (Low), while it represents a permitted state when the stored value is "H" (High).

The control portion 24 is a logic circuit for controlling the activation synchronized with the VD pulse in accordance with the approval or disapproval state which is stored in the VLAT register 30. The control portion 24 includes a picture vertical synchronous counter 32, a latch circuit 34, a latch circuit 36, an AND circuit 38, and a NAND circuit 40.

The picture vertical synchronous counter 32 counts the reference clock CK and generates clocks A, B, and C used to generate pulses with a period corresponding to a period of time for vertical scanning. The clock pulses A, B, and C are arranged so as to be generated in this order. For example, the clock A rises synchronously with the vertical synchronous signal VD pulse to become H level. Next, the clock B rises synchronously with the trailing of the clock A to L level to become H level. Moreover, the clock C rises synchronously with the trailing of the clock B. Incidentally, as will be described later, the clocks B and C are generated in correspondence with a state in which H level is set in the VLAT register 30.

The latch 34 latches a logical value outputted from the VLAT register 30 synchronously with the rise of the clock A from the picture vertical synchronous counter 32 and outputs the latched logical value. The AND circuit 38 receives as its inputs the output of the latch circuit 34 and the clock B, and outputs a logical product of that output and the clock B to a CLK terminal of the latch circuit 36. The latch circuit 36 latches data inputted to a data terminal based on the leading pulse to the CLK terminal and outputs the latched data. As a result, the DSP block 22 can activate a group of control variables set in the register block 20 synchronously with the VD pulse. Here, when the output of the latch circuit 34 is at H level, the AND circuit 38 makes the pulse of the clock B pass therethrough, and makes the latch circuit 36 latch the data inputted to the data terminal synchronously with the vertical synchronous signal VD pulse based on the pulse of the clock B, and output the latched data.

On the other hand, the NAND circuit 40 receives as its inputs the output of the latch circuit 34 and the clock C, and generates an inverted output of a logical product of its two inputs to output the inverted output to each of reset terminals of the VLAT register 30 and the latch circuit 34. Those reset terminals are constructed as active Low, and thus are reset by receiving as their inputs signals at L level. More specifically, when the VLAT register 30 is reset, the logical value held in the VLAT register 30 becomes L level, and the output of the latch circuit 34 becomes L level. The output at L level of the NAND circuit 40 permitting those resets to be realized is generated synchronously with the pulse of the clock C generated for a period of time for which the output of the latch circuit 34 is held at H level.

Figure 3:
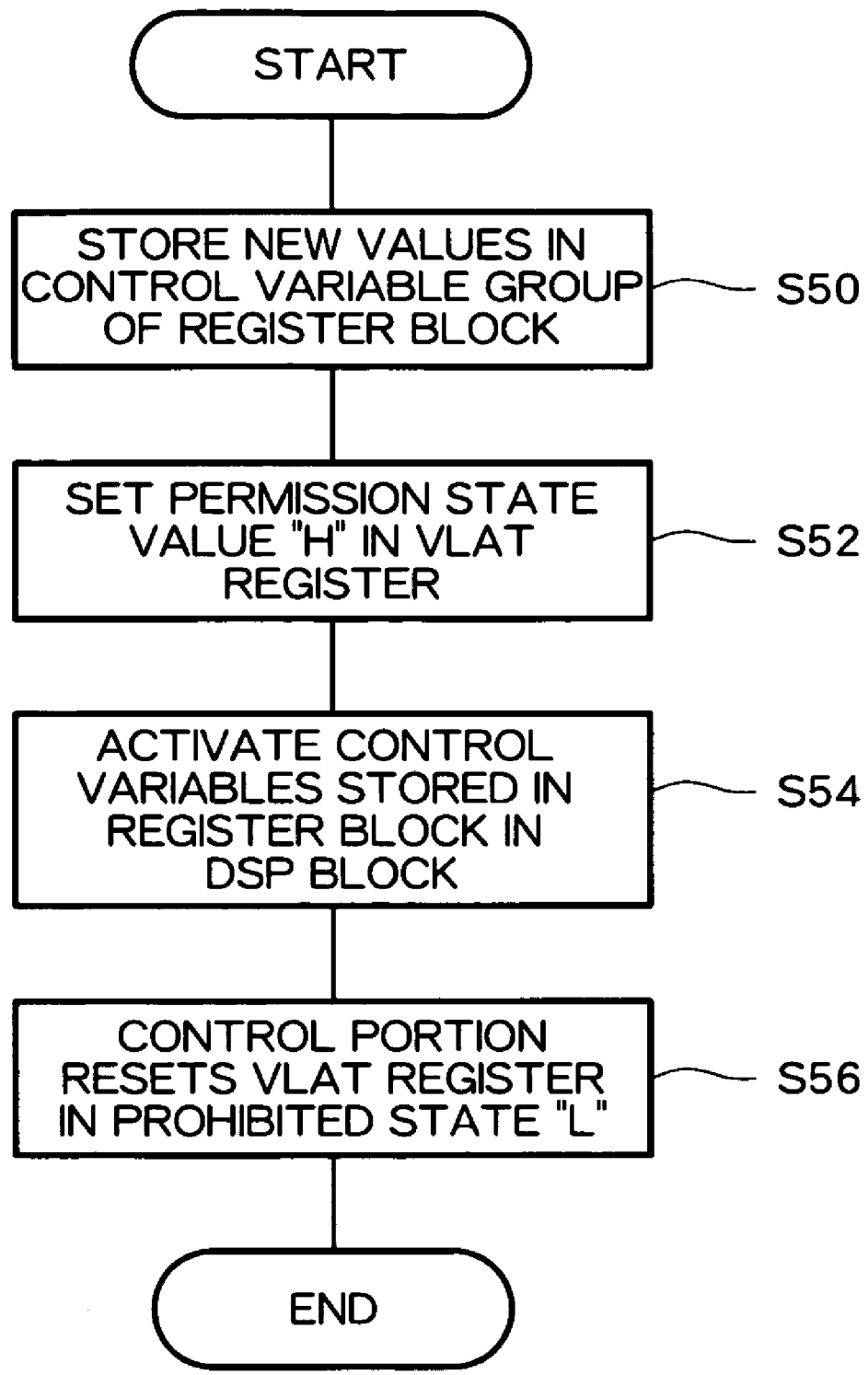
FIG. 3 is a flow chart showing a schematic operation in a digital signal processing circuit when a group of control variables stored in the register block are activated synchronously with a vertical synchronous signal VD.

FIG. 3 is a flow chart showing a schematic operation in the digital signal processing circuit 12 when a group of control variables stored in the register block 20 are activated synchronously with the vertical synchronous signal VD. For example, the register block 20 is connected to the host through a serial clock line (hereinafter referred to as "an SCL") and a serial data line (hereinafter referred to as "an SDL"), and can exchange data with the host through the SDL synchronously with the clock on the SCL. For example, the host side successively stores the values of the new control variables in the register block 20 in accordance with a user's operation or a program (S30). At this time, a value "L" representing a state in which the activation is prohibited is set in the VLAT register 30. Thus, even when the timing of the VD pulse occurs while the host updates the values of a group of control variables, none of the values of the new control variables set in the register block 20 are reflected in the DSP block 22.

When completing the update of a group of control variables for the register block 20, the host sets a value "H" representing a state in which the activation is permitted in the VLAT register 30 prepared for the register block 20 (S52). The control portion 24 applies a rising pulse synchronized with the VD pulse to the CLK terminal of the latch circuit 36 in correspondence with the setting of H level in the VLAT register 30. A group of control variables in the register block 20 are latched by the latch circuit 36 synchronously with the leading pulse and outputted to the DSP block 22. As a result, the set contents of the register block 20 are activated in the DSP block 22 (S54). The control portion 24 resets the value in the VLAT register 30 to a value "L" representing an activation prohibited state when the activation is completed (S56).

Figure 4:
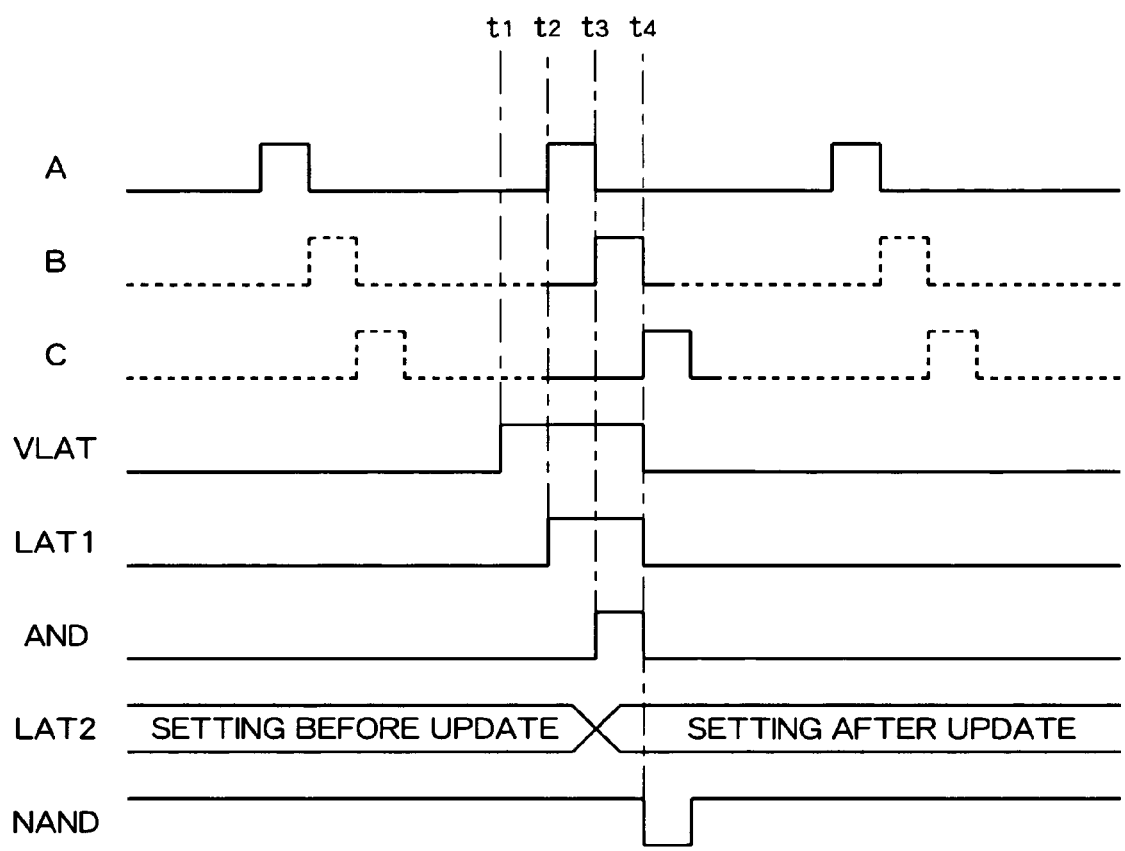
FIG. 4 is a timing chart explaining an operation of a control portion when a group of control variables stored in the register block are activated synchronously with the vertical synchronous signal VD.

FIG. 4 is a timing chart explaining an operation of the control portion 24. Referring to FIG. 4, reference symbols A, B, and C designate the clocks A, B, and C outputted from the picture vertical synchronous counter 32, respectively. Reference symbols VLAT, LAT1, AND, LAT2, and NAND designate the outputs of the VLAT register 30, the latch circuit 34, the AND circuit 38, the latch circuit 36, and the NAND circuit 40, respectively.

When having stored a group of control variables to be updated in the register block 20, the host sets the output of the VLAT register 30 at H level (time t1). The output of the VLAT register 30 is latched by the latch circuit 34 at the subsequent leading edge of the clock A, and thus the output of the latch 30 becomes H level (time t2).

The signal used to make the clocks B and C active becomes an enable state (e.g., H level) in conjunction with the above-mentioned operation. As a result, the clock B generated by the picture vertical synchronous counter 32 is inputted to one terminal of the AND circuit 38. A signal at H level is inputted to the other terminal of the AND circuit 38 at and after a time t2. The level of the output of the AND circuit 38 is changed to H level while the clock B rises to H level, and the clock B is applied to the CLK terminal of the latch circuit 36. Based on the clock B applied to the CLK terminal, a group of control variables set in the register block 20 are latched by the latch circuit 36, inputted to the DSP block 22, and activated (at and after a time t3).

At a time t4 when a group of control variables have been reflected in the DSP block 22, the clockC rises which is made active similarly to the clock B and is then inputted to one terminal of the NAND circuit 40. A signal at H level has been inputted from the latch circuit 34 to the other input terminal of the NAND circuit 40 at and after the time t2. The rising of the clock C to H level changes the level of the output from the NAND circuit 40 to L level, thereby resetting the VLAT register 30 and the latch circuit 34 (time t4). The output of the VLAT register 30 returns back to L level as the activation prohibited state and also the output of the latch circuit 34 becomes L level based on that reset. As a result, a group of control variables is prohibited from being activated from the register block 20 to the DSP block 22 synchronously with the switching of the picture until H level is set in the VLAT register 30 again. In addition, the signal used to make the clocks B and C active is caused to become a disable state (e.g., L level).

Incidentally, the control variable which may be immediately activated in the DSP block 22 after having been set in the register block 20 is constructed so as to be directly outputted from the register block 20 to the DSP block 22 without passing through the control portion 24.

The host monitors the storage contents in the VLAT register 30. When the storage contents therein are in the activation prohibited state, the host can set a group of control variables for which coherency should be secured in the register block 20.

According to the constitution which has been described with reference to FIGS. 2 to 4 so far, for example, a group of control variables which need to be collectively updated to maintain mutual coherency, as at the rise timing and decay timing of the vertical synchronous signal or the horizontal synchronous signal, can be collectively updated in switching of the picture in the DSP block 22. In other words, even when a period of time for which a group of control variables are stored in the register block 20 extends over the processing period for a plurality of pictures, a group of control variables can be reflected in the processing in the DSP block 22 while the coherency is maintained.

While the description has been given with respect to the constitution related to the operation for writing a group of control variables to the DSP block 22 so far, the digital signal processing circuit 12 also has the feature of an operation for reading out a group of control variables from the DSP block 22. Next, a constitution related to the operation for reading out a group of control variables from the DSP block 22, i.e., a constitution in which when, for example, a group of control variables which are periodically updated every picture are read out for a period of time extending over the update timing concerned, the coherency among those control variables is secured, will be described with reference to FIGS. 5 to 7.

Figure 5:
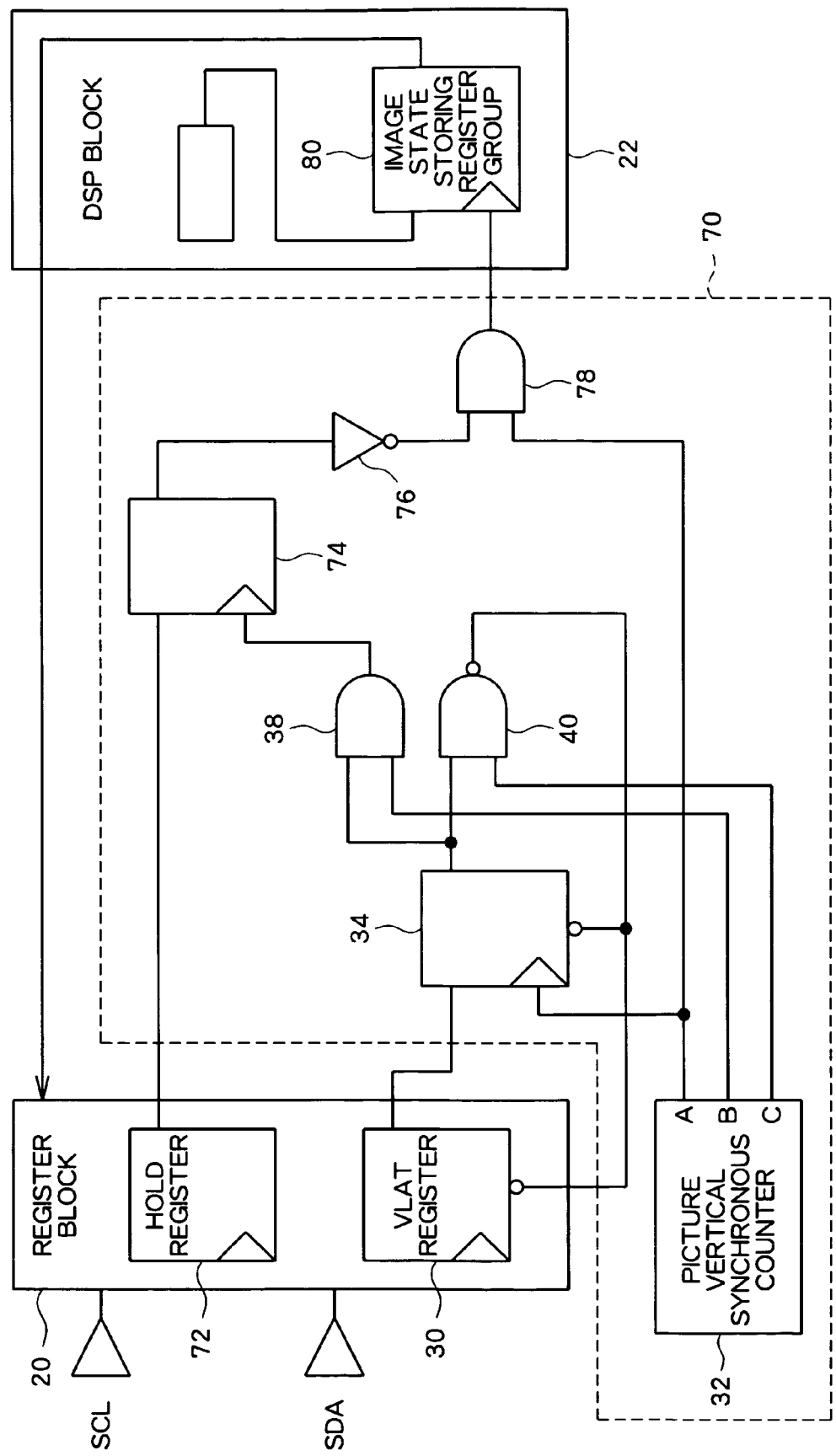
FIG. 5 is a circuit diagram showing an example of a schematic configuration of the DSP related to a case where the control variables updated periodically in the DSP block, for example, are read out to a host side through the register block.

FIG. 5 is a circuit diagram showing an example of a schematic configuration of the DSP. This figure especially shows a configuration with which the control variables which are periodically updated in the DSP block 22, for example, are read out to the host side through the register block 20. Here, it is assumed that the control variable group stored in a register (an image state storing register 80) of the DSP block 22 is updated synchronously with the picture update, and that they have relevance to one another. For example, an integrated value for each of the RGB color components for one picture is given as the control variable group described above. In order to read out the control variable group while coherency is secured, a control portion 70 is provided, and a HOLD register 72 and a VLAT register 30 are provided in the register block 20. The VLAT register 30, and a picture vertical synchronous counter 32, a latch circuit 34, an AND circuit 38, and a NAND circuit 40, which constitute the control portion 70, have a configuration common to the control portion 24 related to the operation for writing the control variable group to the DSP block 22. The control portion 70 also additionally includes a latch circuit 74, an inverter circuit 76, and an AND circuit 78.

When receiving a request to read out the control variable group, the HOLD register 72 is set to a readout requested state, while when no readout request is made, the HOLD register 72 is set to a readout unrequested state. In this case, the HOLD register 72 represents the readout requested state when a value stored therein is "H", and represents the readout unrequested state when the value stored therein is "L". In addition, the VLAT register 30 is used as an operation synchronous flag which is made to rise from L level to H level in conjunction with the respective settings of the readout requested state and the readout unrequested state.

The control portion 70 is a logic circuit for changing an update approval or disapproval state of the control variable group from a permitted state over to a prohibited state in correspondence with the setting of the readout requested state in the HOLD register 72 and for changing the update approval or disapproval state of the control variable group from the prohibited state over to the permitted state in correspondence with the setting of the readout unrequested state in the HOLD register 72. In this case, the control portion 70 performs changing of the currently set update approval or disapproval state from the permitted state over to the prohibited state, and the changing of the currently set update approval or disapproval state from the prohibited state over to the permitted state based on the setting of the output of the VLAT register 30 at H level. After performing the changing of the update approval or disapproval state, the control portion 70 makes the output of the VLAT register change from H level back to L level.

As described above, since of the constituent elements of the control portion 70, the picture vertical synchronous counter 32, the latch circuit 34, the AND circuit 38, and the NAND circuit 40 are connected similarly to the case of the above-mentioned control portion 24 and basically operate similarly thereto, a description of points common to the control portions 24 and 70 is omitted here.

The picture vertical synchronous counter 32 generates the clocks A, B, and C in the manner as described above. As expected, the clocks B and C are generated in correspondence with the state in which H level is set in the VLAT register 30 in the manner as described above. An output of the AND circuit 38 is supplied to a CLK terminal of a latch circuit 74. A pulse synchronized with the clock B is inputted to a CLK terminal of the latch circuit 34 for a period of time for which the output of the VLAT register 30 is at H level. The latch circuit 74 latches a value in the HOLD register 72 at the leading edge of that pulse and outputs the latched value. An inverter circuit 76 inverts the output of the latch circuit 74 and inputs the inverted output to one input terminal of the AND circuit 78. The clock A is inputted to the other input terminal of the AND circuit 78. The AND circuit 78 inputs a logical product of the two inputs to a CLK terminal of an image state storing register 80. When a rise pulse is inputted to the CLK terminal of the image state storing register 80, the update of the contents in the image state storing register 80 becomes possible.

Figure 6:
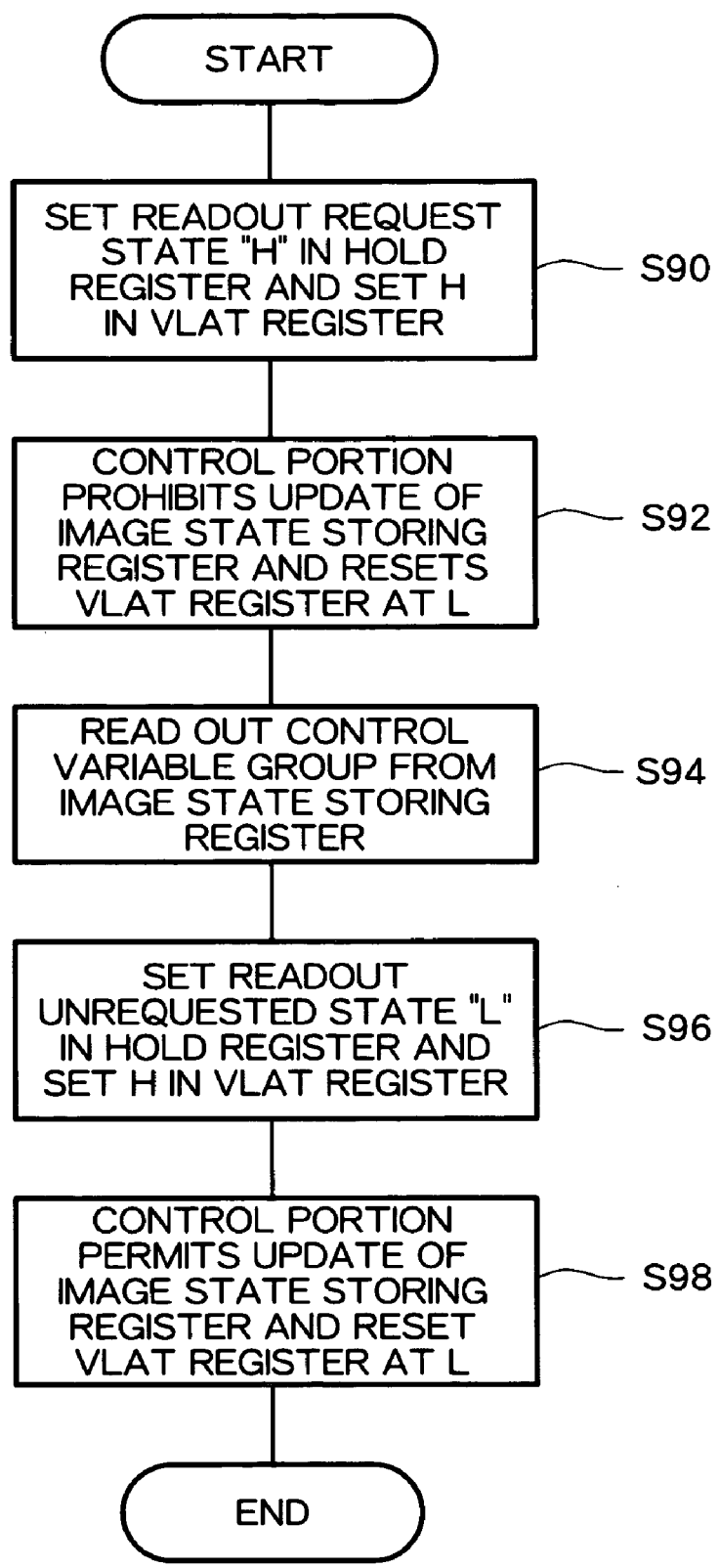
FIG. 6 is a flow chart showing a schematic operation in the digital signal processing circuit when a group of control variables stored in image state storing registers are updated synchronously with the vertical synchronous signal VD.

FIG. 6 is a flow chart showing a schematic operation of the digital signal processing circuit 12 when the control variable group stored in the image state storing register 80 is updated synchronously with the VD signal. When the host communicating with the register block 20, for example, reads out the contents in the image state storing register 80 in accordance with a user operation or a program, the host sets a value "H" representing the readout requested state in the HOLD register 72. In addition, the host sets H level in the VLAT register 30 (S90). In correspondence to the setting of the VLAT register 30 at H level, the control portion 70 latches the readout requested state set in the HOLD register 72 at a timing synchronized with the VDpulse, prohibits the contents of the image state register 80 from being updated, and resets the VLAT register 30 to L level (S92). The host reads out the control variable group from the image state storing register 80 for a period of time for which the contents of the image state storing register 80 are prohibited from being updated (S94). After completing the readout operation, the host sets "L" representing the readout unrequested state in the HOLD register 72, and sets H level in the VLAT register 30 again (S96). In correspondence with the setting of the VLAT register 30 at H level, the control portion 70 latches the readout unrequested state set in the HOLD register 72 at a timing synchronized with the VD pulse, permits the update of the contents of the image state storing register 80, and resets the output of the VLAT register 30 at L level (S98).

Figure 7:
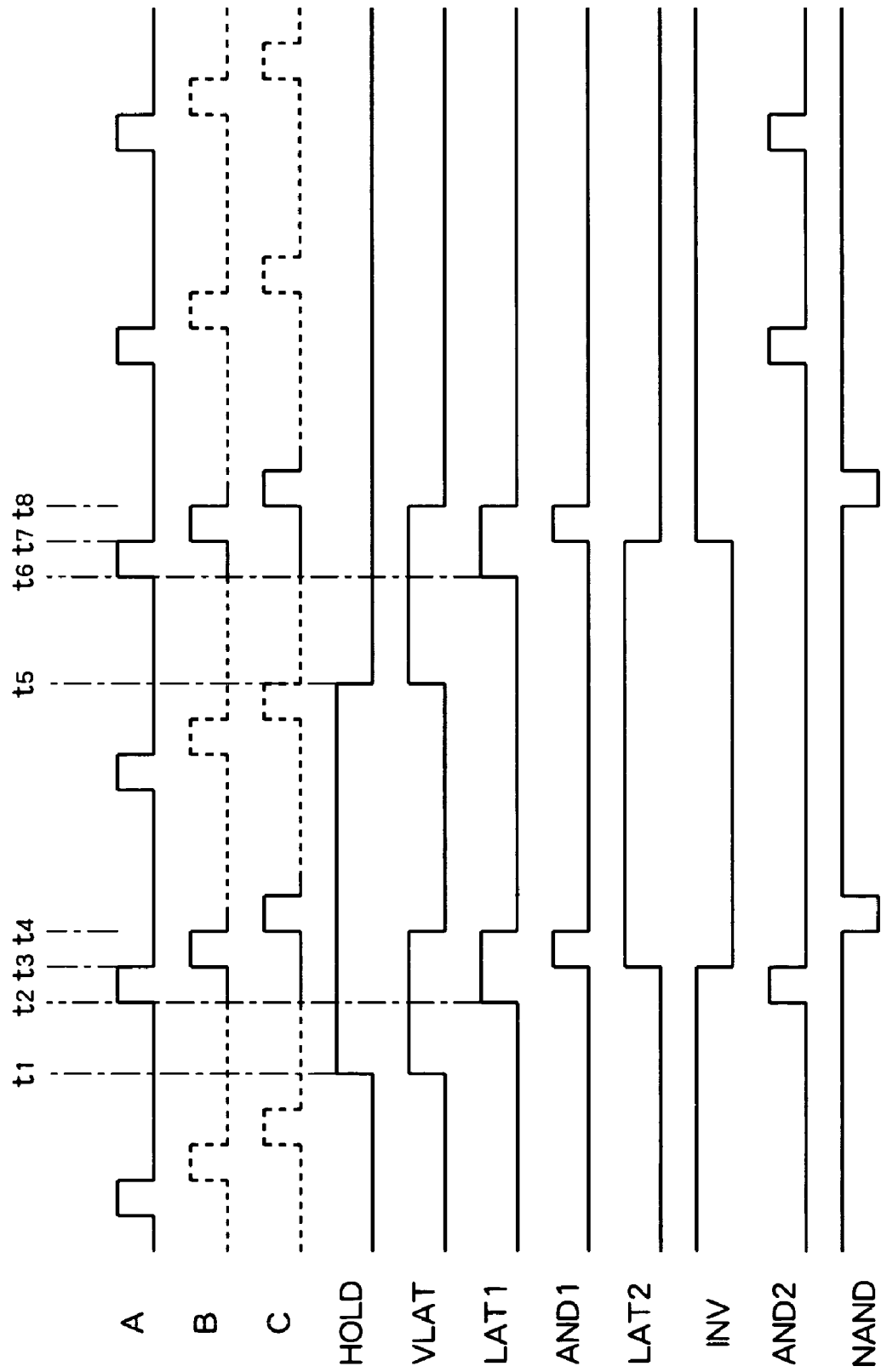
FIG. 7 is a timing chart explaining an operation of the control portion when a group of control variables stored in the image state storing registers are updated synchronously with the vertical synchronous signal VD.

FIG. 7 is a timing chart explaining the operation of the control portion 70. Referring to FIG. 7, reference symbols A, B, and C designate the clocks A, B, and C outputted by the picture vertical synchronous counter 32, respectively. Reference symbols VLAT, LAT1, AND1, LAT2, INV, AND2, and NAND designate the outputs of the VLAT register 30, the latch circuit 34, the AND circuit 38, the latch circuit 74, the inverter circuit 76, the AND circuit 78, and the NAND circuit 40, respectively.

When making the readout request to the image state storing register 80, the host sets the HOLD register 72 at H level, and sets the VLAT register 30 at H level (S90, time t1). At the subsequent leading edge of the clock A, the output of the VLAT register 30 is latched by the latch circuit 34 and the output of the latch circuit 34 becomes H level (time t2).

The signal used to make the clocks B and C active becomes an enable state (e.g., H level) in conjunction with that operation. As a result, the clock B generated from the picture vertical synchronous counter 32 is inputted to one input terminal of the AND circuit 38. The signal at H level is inputted to the other input terminal of the AND circuit 38 at and after a time t2. Thus, when the clock B rises to H level, the output of the AND circuit 38 is changed to H level (time t3). The latch circuit 74 latches the output at H level from the HOLD register 72 and outputs the latched output at a time t3 with the output of the AND circuit 38 as a trigger signal.

The inverter circuit 76 inverts the output of the latch circuit 74 and outputs the resulting signal at L level (time t3) In correspondence with output of the output at H level from the inverter circuit 76, the AND circuit 78 has supplied the signal at H level to a CLK terminal of the image state storing register 80 every rise of the clock A until that time. However, since the output of the inverter circuit 76 becomes L level, the AND circuit 78 stops the supply of the clockAto the image state storing register 80. That is, the output of the inverter circuit 76 becomes a gate signal for the operation for updating the data outputted from the image state storing register 80. Thus, the data outputted from the image state storing register 80 is prohibited from being updated while the output of the inverter circuit 76 is at L level (S92).

After the output of the inverter circuit 76 is changed to L level, the clock C which is made active similarly to the clock B rises, and is inputted to one input terminal of the NAND circuit 40. The signal at H level has been inputted from the latch circuit 34 to the other input terminal of the NAND circuit 40 at and after the time t2. The clock C rises to H level, as a result of which the output of the NAND circuit 40 is changed to L level to reset the VLAT register 30 and the latch circuit 34 (time t4). The output of the VLAT register 30 returns back to L level and the output of the latch circuit 34 also becomes L level through this reset. After setting H level in the HOLD register 72, the host can recognize that the image state storing register 80 is set in the update prohibited state from the fact that the contents of the VLAT register 30 return back to L level. At and after this time, the host starts to read out the control variable group from the image state storing register 80 (S94).

After completing the operation for reading out the control variable group from the image state storing register 80, the host sets L level in the HOST register 72 and sets H level in the VLAT register 30 (S96, time t5). The output of the VLAT register 30 is latched by the latch circuit 34 and thus the output of the latch circuit 34 becomes H level at the subsequent leading edge of the clock A (time t6).

The signal used to make the clocks B and C active becomes the enable state again in conjunction with that operation. The signal at H level has been inputted from the latch circuit 34 to one input terminal of the AND circuit 38 at and after the time t6. Thus, when the clock B rises to H level, the output of the AND circuit 38 is changed to H level and triggers the latch action of the latch circuit 74 (time t7). The latch circuit 74 latches the output at L level outputted from the HOLD register 72 at the time t7 and outputs the latched output.

The output of the inverter circuit 76 becomes H level in correspondence with the change of the output of the latch circuit 74 (time t7). As a result, the AND circuit 78 restarts the operation for supplying the pulse to the CLK terminal of the image state storing register 80 every rising of the clock A to release the prohibition of the update of the contents of the image state storing register 80 (S98).

After the output of the inverter circuit 76 is changed to H level, the clock C rises to H level, thereby changing the output of the NAND circuit 40 to L level to reset the VLAT register 30 and the latch circuit 34 (time t8). The output of the VLAT register 30 returns back to L level and the output of the latch circuit 34 also becomes L level through this reset. After setting L level in the HOLD register 72, the host can detect that the image state storing register 80 is set in an update permitted state from the fact that the contents of the VLAT register 30 return back to L level.

According to the constitution which has been described with reference to FIGS. 5 to 7 so far, the control variable group which is updated in the DSP block 22 synchronously with the switching of the picture can be read out without being conscious of the switching of the picture. That is, those control variables are prohibited from being updated, whereby the coherency among those control variables is maintained even when a period of time required for the readout operation extends over the processing period of a plurality of pictures.

In the above-mentioned constitution, the VLAT register 30 is used in order to switch the update approval or disapproval state of the image state storing register 80 synchronized with the switching of the picture. In addition, the value of the VLAT register 30 is utilized as a flag with which the host detects that the image state storing register 80 changes to the update prohibited state and judges the timing of start of the readout operation.

Incidentally, the constitution can also be made such that the update approval or disapproval state is immediately switched in accordance with the request made by the host. In this case, the constitution can be made such that the image state storing register 80 is set in the update prohibited state in correspondence to the setting of the HOLD register 72 at H level by the host, and for example, the host starts to perform the readout operation synchronously with the subsequent VD pulse. When the host completes the readout operation, the output of the HOLD register 72 is set at L level, and the state of the image state storing register 80 can be switched over to the update permitted state accordingly. The switching of the update approval or disapproval state, the detection of the readout start timing by the host, and the like can also be realized without using the VLAT register 30 in such a manner.

As set forth hereinabove, according to the present invention, when a group of control variables having relevance to one another are set in the register, a group of control variables are prohibited from being activated for the signal processing until those settings are completed. That is, the mutual coherency is secured even when a period of time required to set a group of control variables extends over the ordinary timing for the activation. In addition, according to the present invention, when a group of control variables having relevance to one another are read out, a group of control variables are prohibited from being updated until the readout operation is completed. That is, the contents for which the mutual coherency is secured are read out even when a period of time required to read out a group of control variables extends over the ordinary timing at which the update is performed. As described above, according to the present invention, the host side for performing the setting and readout of a group of control variables does not need to be conscious of the timing of the activation and update synchronized with the synchronous signal. As a result, the setting and the readout become easy to perform.

What is claimed is:

1. An image signal processor for fetching a group of control variables set in registers in signal processing and collectively activating the group of control variables thus fetched synchronously with a synchronous signal of an image signal, said image signal processor comprising:
   an activation approval or disapproval state storing portion which represents an approval or disapproval state for the activation of the group of control variables and in which the approval or disapproval state is changed from an activation prohibited state to an activation permitted state in correspondence with completion of setting of the group of control variables in said registers;
   a control portion for controlling the activation synchronized with the synchronous signal in correspondence with the approval or disapproval state which is stored in said activation approval or disapproval state storing portion; and
   an image processing portion for processing the image signal using the group of activated control variables.

2. The image signal processor according to claim 1, wherein said control portion sets the approval or disapproval state, which is stored in said activation approval or disapproval storing portion, to the activation prohibited state after the activation is performed.

3. An image signal processor for updating a group of control variables stored in registers synchronously with update of a picture, said image signal processor comprising:
   a readout request state storing portion which is set in a readout requested state in accordance with a readout request made to the group of control variables, and set in a readout unrequested state when no readout request is made;

a control portion for switching an update approval or disapproval state of the group of control variables from a permitted state over to a prohibited state in correspondence with the setting of the readout requested state and for switching the update approval or disapproval state of the group of control variables from the prohibited state over to the permitted state in correspondence with the setting of the readout unrequested state; and an image processing portion for processing the image signal, generating the group of control variables in the image signal processing, and updating contents of the registers in the permitted state with the group of generated control variables.

4. The image signal processor according to claim 3, further comprising an operation synchronous flag which is changed from a first state over to a second state in correspondence with the settings of the readout requested state and the readout unrequested state, wherein said control portion, based on said operation synchronous flag being set in said second state, switches the update approval or disapproval state from one state which is currently set over to the other state, and restores said operation synchronous flag from the second state back to the first state.

5. The image signal processor according to claim 3, wherein said control portion switches the update approval or disapproval state synchronously with a synchronous signal of an image signal.

* * * * *